United States Patent [19]

Doyle

[11] Patent Number: 4,667,153
[45] Date of Patent: May 19, 1987

[54] AUTOMATIC CALIBRATOR

[76] Inventor: James H. Doyle, 1247 W. Grove Ave., Orange, Calif. 92665

[21] Appl. No.: 735,464

[22] Filed: May 17, 1985

[51] Int. Cl.⁴ .......................... G01R 1/02; H03F 1/02
[52] U.S. Cl. ........................................ 324/130; 330/9
[58] Field of Search .................... 324/130, 111; 330/9; 340/347 CC

[56] References Cited

U.S. PATENT DOCUMENTS 3,784,912 1/1974 Van Aken ................ 340/347 CC X

Primary Examiner—Ernest F. Karlsen
Assistant Examiner—Vinh P. Nguyen
Attorney, Agent, or Firm—Fulwider, Patton, Rieber, Lee & Utecht

[57] ABSTRACT

A self calibrating electronic instrument for measuring a physical quantity. The instrument generates an internal correction signal that forces its output to zero whenever it is determined that no physical quantity is present for measurement. The correction signal so generated is preserved and continuously applied as a correction signal during intervals when measurements are being performed.

2 Claims, 2 Drawing Figures

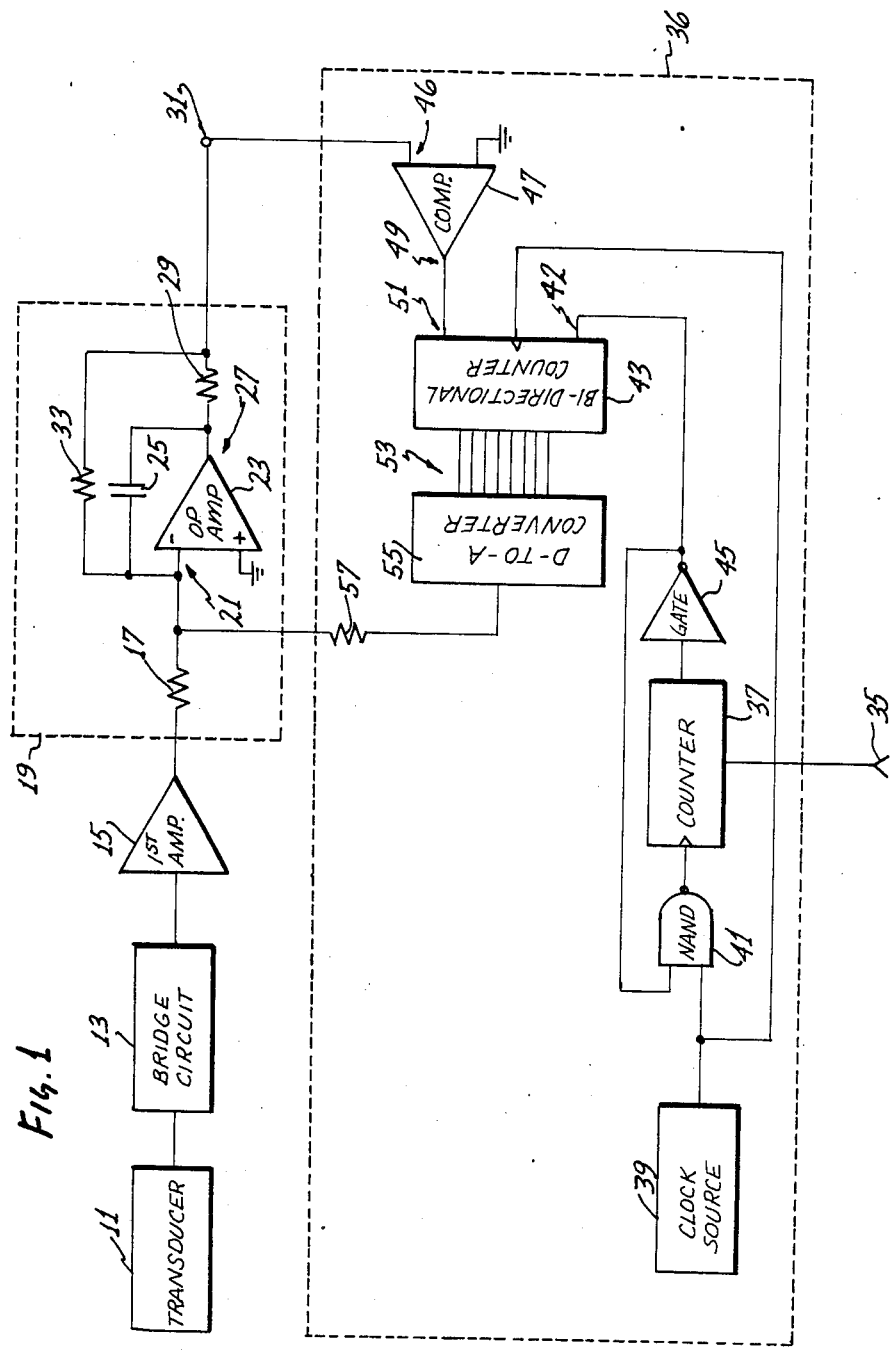

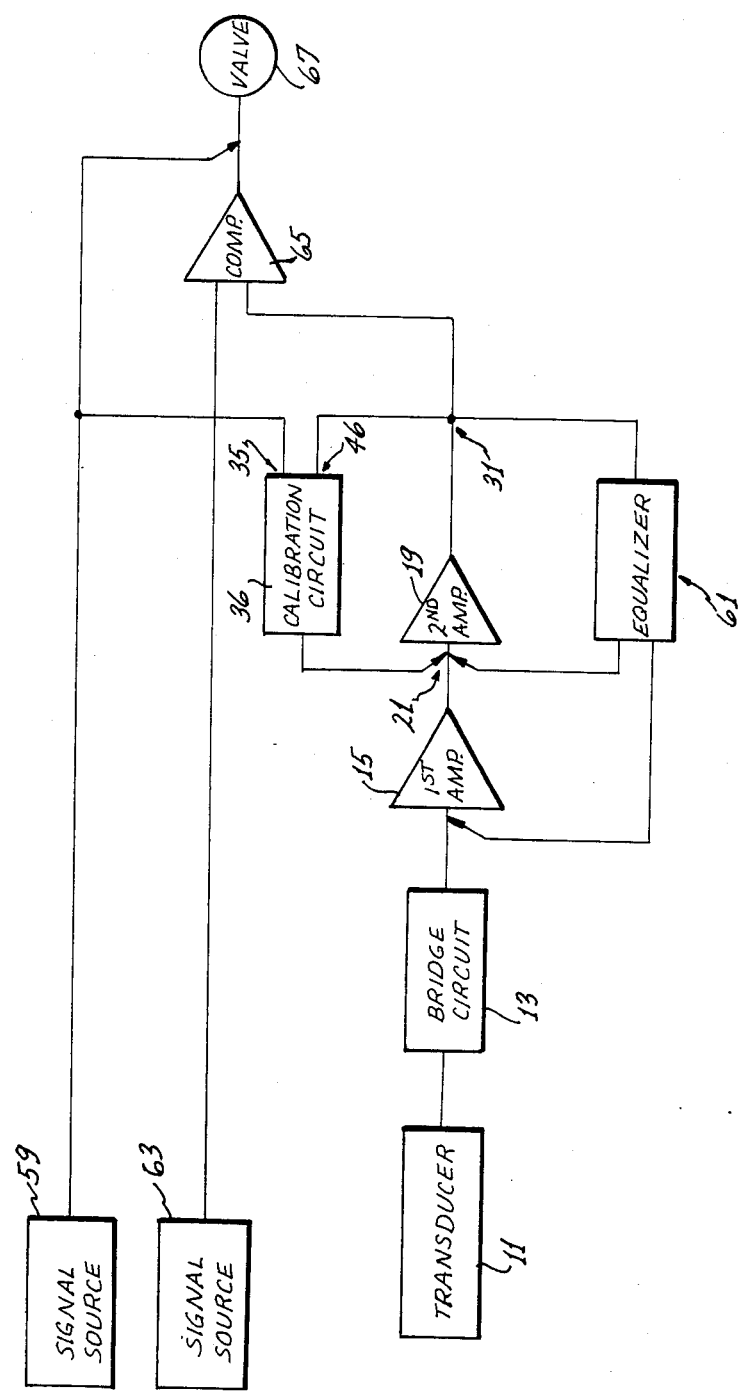

AUTOMATIC CALIBRATOR

BACKGROUND OF THE INVENTION

1. FIELD OF THE INVENTION

The present invention relates generally to electronic measuring instruments, and in particular to the calibration of electronic measuring instruments having transducers that produce electrical signals in response to physical quantities and electronic circuitry that processes these signals.

2. THE PRIOR ART

Electronic instruments using transducers that produce electrical signals indicative of the magnitudes of physical quantities are known to the art. Examples of such instruments include electronic scales and gas flow controllers. Typically, a transducer employed by such an instrument is connected as an arm of a bridge circuit, and when a physical quantity to be measured (such as weight, gas flow, or the like) is sensed by the transducer, the bridge produces a signal indicative of the magnitude of the quantity being measured. This signal is amplified to yield an output signal that in turn can be used for such purposes as activation of a display or control of a process.

Calibration of an electronic measuring instrument is normally carried out by applying a plurality of physical quantities of known magnitudes to the transducer, one at a time, and adjusting the resulting output signal to desired levels corresponding with these known magnitudes. However, if the overall system response of the instrument is linear, then only two calibration points are needed to fix the origin and slope of a "calibration line" defining the relationship between the magnitude of the physical quantity being measured and the magnitude of the output signal. Zero is frequently chosen as a convenient reference point that can be used to determine the origin of the calibration line.

After initial calibration has been performed, the instrument can be expected to drift slowly out of calibration as time passes, due to aging of the components and other causes. Accordingly, periodic recalibration is necessary in order to preserve the initial accuracy of the instrument, and such recalibration must be done manually from time to time.

Although both the origin and the slope of the calibration line are subject to drift, drift of the origin away from zero, a drift manifested by the introduction of an error of constant magnitude into all the measurements, is the more common kind of drift and generally has the more serious impact on instrument accuracy. If such drift could be automatically compensated for, the accuracy of electronic measuring instruments would be significantly improved and the permissible time between successive recalibrations could be correspondingly increased without sacrificing instrument accuracy.

It will be apparent from the foregoing that there is a need for an electronic instrument that automatically compensates for drift in the origin of its calibration line. The present invention satisfies this need.

SUMMARY OF THE INVENTION

The present invention resides in an electronic measuring instrument that internally generates a correction signal that forces the output of the instrument to zero in the absence of a physical quantity to be measured. This correction signal is held constant as long as measurements are being performed, and is automatically redetermined each time the instrument is not being used to perform a measurement.

In accordance with the invention, an electronic measuring instrument has means, independent of the transducer, for determining that nothing is present to be measured, and when this determination has been made, a comparator circuit measures the magnitude of the output signal. If the output signal is not zero, a correction signal is generated. The polarity of the correction signal indicates whether a positive or a negative correction must be applied. A correction signal of the appropriate polarity is generated by a bidirectional parallel output counter in combination with a digital to analog converter, and this correction signal is applied as negative feedback to force the output signal to zero. The counter is blocked from changing its count whenever a physical quantity is being measured, thereby preserving the correction signal at constant magnitude. Each time the instrument is not being used to measure a physical quantity, the counter is again enabled and the correction signal is redetermined so as to again force the output signal to zero. In this way, the instrument is frequently recalibrated, automatically, with respect to the origin of the calibration line, thereby tending to eliminate errors resulting from long term drift of the transducer and bridge circuit.

It will be appreciated from the foregoing that the present invention represents a significant advance in the field of electronic measuring instruments. In particular, an instrument according to the present invention automatically recalibrates itself with respect to the origin of its calibration line each time it is idle, thereby improving its accuracy and increasing the interval of time that can pass between manual recalibrations without sacrificing instrument accuracy.

Other aspects and advantages of the present invention will become apparent from the following more detailed description taken in conjunction with the accompanying drawings.

BRIEF DESCRIPTION OF THE DRAWINGS

FIG. 1 is a block diagram of an automatic calibrator according to the present invention; and FIG. 2 is a block diagram of a gas flow controller employing an automatic calibrator according to the present invention.

DESCRIPTION OF THE PREFERRED EMBODIMENT

An electronic measuring instrument according to the prior art requires frequent recalibration to maintain its accuracy. The present invention provides a circuit that automatically recalibrates the origin of the calibration line of the instrument during those times when no quantity is present for measurement.

In accordance with the invention, an electronic measuring instrument has a transducer 11 connected to a bridge circuit 13 as shown in FIG. 1. A first amplifier stage 15 is connected to the bridge circuit 13, and the output of the first amplifier stage 15 is connected to an input resistor 17 of a second amplifier stage 19. The input resistor 17 connects to a summing input 21 of an operational amplifier 23, and a feedback capacitor 25 connects from the summing input 21 to the output 27 of the amplifier 23. The output 27 connects through a resistor 29 to an output connection point 31, and a feedback resistor 33 connects from the connection point 31 back to the summing input 21.

The absence of a physical quantity to be measured is indicated by the presence of a signal at an input 35 of an automatic calibration circuit 36. The circuit 36, which includes components 37 through 57, provides a correction signal to the summing input 21 of the amplifier stage 19. More particularly, the signal provided to the input 35 may be generated, for example, by the closure of a valve in a gas flow controller, by a manually operated switch, or by some other means independent of the transducer 11. It will often be desirable to delay the start of the recalibration process for some interval of time after a signal arrives at the input 35, for example to permit the transducer 11 and its associated circuits to stabilize after the removal of the physical quantity that was being measured before the arrival of a signal at the input 35. Such a delay is provided by a counter 37. The counter 37 is enabled by a signal from the input 35 and begins counting in response to a clock signal from a clock source 39 applied to the counter 37 through a NAND gate 41. After the counter 37 reaches a count corresponding with the passage of the desired delay interval, it generates an activation signal that is applied to an enable input 42 of a bidirectional counter 43 through a gate 45. This activation signal is also fed back to the NAND gate 41, shutting off the flow of clock pulses to the counter 37.

The output signal at the connection point 31 is applied to an input 46 of a comparator 47. The comparator 47 returns at its output 49 a responsive signal according to whether the output signal is positive or negative, and this responsive signal is applied to an up/down selector input 51 of the bidirectional counter 43. The bidirectional counter 43 counts either up or down, according to the polarity of the signal present at the up/down input 51. The bidirectional counter 43 is driven by the clock source 39. The bidirectional counter 43 has a plurality of outputs 53 that are applied to a digital-to-analog converter 55. The converter 55 produces a correction signal responsive to the state of the bidirectional counter 43, and this correction signal is applied to the summing input 21 of the amplifier stage 19 through a resistor 57. The correction signal is of a polarity that tends to oppose the output signal at the connection point 31. Thus, if the output signal is positive, the correction signal tends to drive the output signal negative, and if the output signal is negative, the correction signal tends to drive it positive. This arrangement tends to drive the output signal to zero, and the circuit quickly stabilizes, the output signal wobbling back and forth from very slightly negative to very slightly positive.

If the signal at the input 35 vanishes, indicating that a physical quantity is again present for measurement, the counter 37 is at once reset and the activation signal disappears from the enable input 42 of the bidirectional counter 43. The count that bidirectional counter 43 had just prior to the disappearance of the activation signal is preserved, and the corresponding correction signal continues to be applied to the summing input 21 of the amplifier stage 19. In this way the calibration of the origin of the calibration line is preserved until the next time a signal is presented at the input 35, at which time the process is repeated and the origin is recalibrated once again.

A calibration circuit according to the invention can be employed in many kinds of electronic instruments. An example of such an application is the use of the calibration circuit 36 in a gas flow controller, depicted in block diagram form in FIG. 2. The transducer 11, in this context a transducer that responds to the rate of flow of a gas, is connected to the bridge circuit 13, and the bridge circuit 13 is in turn connected to the first amplifier stage 15. The first amplifier stage 15 is connected to the second amplifier stage 19, and the output of the second amplifier stage 19 is applied to the input 46 of the comparator 47 (not shown in FIG. 2) in the circuit 36. A signal from a source designated as block 59 indicating the absence of the flow of the gas is applied to the input 35. The correction signal is applied to the summing input 21 of the second amplifier stage 19. An equalizer circuit 61 is connected to the amplifier stages 15 and 19. A signal from a source designated as a block 63, indicating the desired flow rate to be maintained, is applied along with the output signal from connection point 31 to a comparator 65, and the comparator 65 causes valve 67 to open or close as necessary to maintain the desired rate of gas flow.

An electronic measuring instrument according to the present invention automatically recalibrates its zero point each time there is no physical quantity present for measurement. The accuracy of the instrument is improved and the permissible interval between manual recalibrations is increased, thereby resulting in more reliable and accurate performance of the instrument.

Of course, various modifications and changes may be made with regard to the foregoing detailed description without departing from the spirit of the invention. It is therefore to be understood that, within the scope of the appended claims, the invention may be practiced otherwise than as specifically described.

I claim:

1. An automatic calibrator for causing a desired signal to be generated when a physical quantity present for measurement assumes a predetermined magnitude, the calibrator comprising:

a transducer operative to produce an initial signal indicative of the magnitude of said physical quantity;

amplifier means for amplifying the initial signal to produce an output signal;

means for determining that the physical quantity has assumed said predetermined magnitude;

means for comparing the output signal produced when the physical quantity assumes said predetermined magnitude with said desired signal, said comparator means operative to produce a comparison signal having one polarity if the output signal is greater than the desired signal and an opposite polarity if the output signal is less than the desired signal;

a clock signal;

bidirectional counter having a plurality of outputs to provide a digital signal, responsive to the clock signal to increment or to decrement the digital signal according to the polarity of the comparison signal;

a digital-to-analog converter, responsive to the counter to produce an analog correction signal proportional to the magnitude of the digital signal;

means for applying said analog signal to the amplifier means whereby said analog signal will tend to increase the output signal if said output signal is less than the desired signal and to reduce said output signal if said output signal is greater than the desired signal; and means for preventing the counter from incrementing or decrementing the digital signal when said physical quantity assumes a magnitude different from said predetermined magnitude.

2. Apparatus according to claim 1, comprising in addition means for preventing the counter from incrementing or decrementing the digital signal for a predetermined interval of time after determining that the physical quantity has assumed said predetermined mangitude.

* * * * *

UNITED STATES PATENT AND TRADEMARK OFFICE
CERTIFICATE OF CORRECTION

PATENT NO. : 4,667,153

DATED : May 19, 1987

INVENTOR(S) : James H. Doyle

It is certified that error appears in the above-identified patent and that said Letters Patent is hereby corrected as shown below:

Column 4, line 44, before "means" insert "comparator"; and

Column 4, line 53, before "bidirectional" insert "a".

Signed and Sealed this

Twenty-ninth Day of September, 1987

Attest:

DONALD J. QUIGG

Attesting Officer

Commissioner of Patents and Trademarks